United States Patent [19]

Wagner et al.

[11] Patent Number: 4,790,574

[45] Date of Patent: Dec. 13, 1988

[54] APPARATUS FOR COUPLING TUBULAR MEMBERS

[75] Inventors: Wayne M. Wagner, Apple Valley; Douglas E. Flemming, Rosemount; Gary J. Rocklitz, Burnsville; Timothy Bethke, Apple Valley, all of Minn.

[73] Assignee: Donaldson Company, Inc., Minneapolis, Minn.

[21] Appl. No.: 3,947

[22] Filed: Jan. 16, 1987

[51] Int. Cl.⁴ .............................................. F16L 21/06
[52] U.S. Cl. .................................... 285/419; 285/420
[58] Field of Search ................ 285/419, 373, 367, 420

[56] References Cited

U.S. PATENT DOCUMENTS

| | | |
|---|---|---|
| Re. 30,042 | 7/1979 | Hiemstra et al. . |
| 186,125 | 1/1877 | Graham . |
| 627,987 | 7/1899 | Dick . |
| 813,674 | 2/1906 | Skirrow . |
| 848,139 | 3/1907 | Stuppar . |
| 946,207 | 1/1910 | Doak . |
| 973,466 | 10/1910 | Beegen . |
| 1,146,813 | 7/1915 | Reser . |
| 1,594,258 | 7/1926 | Hansen . |
| 2,213,022 | 8/1940 | Stauffer . |
| 2,217,664 | 10/1940 | Berger . |
| 2,227,551 | 1/1941 | Morris . |
| 2,262,627 | 11/1941 | Whitesell et al. . |
| 2,314,236 | 3/1943 | Mott . |
| 2,712,456 | 7/1955 | McCreery . |
| 2,713,352 | 7/1955 | Schustack . |
| 2,787,051 | 4/1957 | Risley . |
| 2,853,762 | 9/1958 | Smith . |
| 2,908,061 | 10/1959 | Adams . |
| 2,931,083 | 4/1960 | Sidenmark et al. . |
| 2,998,629 | 9/1961 | Smith . |
| 3,004,781 | 10/1961 | Morris . |
| 3,087,221 | 4/1963 | Armstrong . |
| 3,089,212 | 5/1963 | Graham et al. . |
| 3,122,098 | 2/1964 | Glennan . |
| 3,124,376 | 3/1964 | Stovall . |
| 3,216,079 | 11/1965 | Keyworth . |
| 3,370,122 | 2/1968 | Ichikawa . |
| 3,386,535 | 6/1968 | Bishop et al. . |
| 3,402,436 | 9/1968 | Oetiker . |
| 3,411,748 | 11/1968 | Fortune . |
| 3,425,719 | 2/1969 | Burton . |
| 3,432,916 | 3/1969 | Fisher et al. . |
| 3,490,794 | 1/1970 | Swanson . |
| 3,513,512 | 5/1970 | Phillips . |
| 3,572,778 | 3/1971 | Cassel . |
| 3,680,180 | 8/1972 | Gould et al. . |
| 3,708,834 | 1/1973 | Anderson et al. . |
| 3,847,419 | 11/1974 | Brown . |
| 3,905,621 | 9/1975 | DeMarco . |
| 3,905,623 | 9/1975 | Cassel . |
| 4,056,273 | 11/1977 | Cassel . |
| 4,142,743 | 3/1979 | McGowen et al. . |
| 4,312,526 | 1/1982 | Cassel ................... 285/419 |
| 4,408,788 | 10/1983 | Beukema ............... 285/419 |
| 4,417,755 | 11/1983 | Gittleman .......... 285/367 X |
| 4,463,975 | 8/1984 | McCord ................. 285/419 |
| 4,466,642 | 8/1984 | Tonchen . |
| 4,611,839 | 9/1986 | Rung et al. ........ 285/419 X |

FOREIGN PATENT DOCUMENTS

| | | |
|---|---|---|
| 1282373 | 11/1968 | Fed. Rep. of Germany . |
| 68929 | 2/1930 | Sweden . |
| 98139 | 3/1923 | Switzerland . |

Primary Examiner—Thomas F. Callaghan
Attorney, Agent, or Firm—Merchant, Gould, Smith, Edell, Welter & Schmidt

[57] ABSTRACT

A clamp suitable for joining a pair of tubular members, e.g., commercial truck exhaust pipes. One clamp (70) according to the invention includes an S-shaped band (72) having a pair of forward curved portions (76) on either side of a reverse curved portion (78). Attached to each forward curved portion (76) is a reinforcing bar (74) preferably forming a pair of D-shaped holes (75) suitable for receiving "half-carriage" bolts (100). The band (72) is preferably formed from Type 409 stainless steel to reduce costs. A fully preformed (cylindrical) embodiment (120) and flat embodiment (130) are also disclosed.

29 Claims, 3 Drawing Sheets

APPARATUS FOR COUPLING TUBULAR MEMBERS

FIELD OF THE INVENTION

The present invention relates generally to connectors, and more particularly to methods and apparatus for joining two tubular conduits in end-to-end fashion to give a tight and rigid joint.

BACKGROUND OF THE INVENTION

There are many applications for conduit couplers or connectors, especially where it is desirable to provide a strong mechanical connection without obstructing fluid flow within the conduit. Although the present invention is generally applicable to tubing and hoses of various types, it will be discussed in terms of rigid and flexible metal tubing and hoses associated with exhaust systems of commercial trucking equipment.

The technology of commercial truck exhaust system couplers has experienced an extensive evolution in the recent past. An early technique involved inserting one tubular member into another and securing the two members together by tightening a U-bolt against a semi-circular shoe, using what is known as a quillotine clamp or saddle clamp. This arrangement has the drawback that it deforms the cross-sections of the tubes from circular to elliptical, so that stresses are non-uniform and so that exhaust gas and sound can leak paraxially, i.e., parallel to the axes of the members. A further defect of the arrangement is that the narrow U-bolt frequently dimples the outer tubular member into the inner one, in such a fashion that when the U-bolt is removed it is impossible to disassemble the complete system without cutting the metal. Again, the U-bolt arrangement is very severe in its action on flexible metal hose, while at the same time being relatively inefficient in preventing leaks along the helical grooves in such hoses.

Efforts were made to overcome the defects of U-bolt type clamps by using fairly rigid closed cylinders generally of internal diameter to match the outside diameter of the tubes being clamped, and with means for contracting the coupler cylinder to provide circumferential clamping pressure substantially all the way around its periphery. Such clamps must obviously be positioned at the time the exhaust system is being assembled, although they need not be tightened until later, and, by the same token, they cannot be replaced without disassembling the system.

Other related structures are known, such as that disclosed in U.S. Pat. No. 3,411,748, wherein a relatively rigid split cylinder of appropriate diameter is provided with ears or flanges which are drawn together to produce the necessary circumferential clamping force.

Such heavy gauge or rigid couplers are perceived to have several shortcomings, particularly when used to join tubular members of different outside diameters, as is necessary when one tube is inserted within another. In order to accommodate different outside diameters using heavy gauge clamps, it has been necessary to specially construct stepped clamp diameters to fit the two tubes being joined, one around the outside of the larger tube and one around the outside of the smaller tube where it emerges from the larger tube. Sizes and modifications tend to proliferate in such structures to the point where mass production is no longer economically feasible.

In addition, heavy gauge preformed couplers cannot be efficiently stored or stacked. In factory settings, original equipment manufacturers often prefer to have preformed, substantially cylindrical clamps with which they can quickly and easily couple exhaust tubes. On the other hand, in the field it is preferable to have somewhat flat clamps which have not been substantially preformed for the reason that they can be more readily stored in their flat state, resulting in a higher "packing density" of the clamps.

In response to the problems discussed above, relatively ductile flat clamps or couplers were developed. An example of this type of coupler is disclosed in U.S. Reissue Patent No. 30,042, issued to Hiemstra et al and owned by the assignee herein. Such a flat clamp or connector can be installed in a tubing system after the system has been assembled, and accommodates not only tubes of the same diameter, but also tubes of approximately the same diameter such as telescoped tubes, gripping and sealing both the larger and the smaller tube without any special machining or size selection. Such flat clamps are also easily packaged for shipment and storage since before use they are essentially flat and stack or nest very compactly. Another example of this type of clamp is disclosed in U.S. Pat. No. 4,142,743, issued to McGowen et al. The clamps described in these patents generally include a fairly thin band of ductile metal (e.g., annealed 304 stainless steel) extending between a pair of reinforcement bars. The band is wrapped about the pipe joint and stretched to conform to the pipes as the reinforcement bars are bolted together.

While the ductile metal clamps discussed above are generally very useful for their intended purposes, it is perceived that they possess certain shortcomings for some applications. One problem stems from the fact that the clamps employ 304 stainless steel or the like as the preferred band material. Strictly from a functional standpoint, the ductility of 304 SS makes it an excellent choice: 304 SS can accommodate roughly a 65% increase in length before failing. On the other hand, 304 SS costs about $1.30 per pound. By contrast, 409 SS can only accommodate an increase of 35% in length prior to failure, but costs only about 75 cents per pound.

Another perceived shortcoming of existing ductile metal clamps results from the frictional load on the clamps as they are wrapped about the pipe joint. Friction between the pipes to be joined and the band causes the band to stretch more at its ends than in its central portion. That is, if a clamp having length A is wrapped about a joint having a circumference greater than A, tensile stresses in the band will be markedly concentrated at the end portions of the band near the reinforcement bars. Applying lubricant to the outer surface of the joint in an effort to equalize tension over the entire length of the band is helpful, but inefficient.

One proposed solution to the non-uniform stretching problem discussed above is represented by U.S. Pat. No. 4,466,642, issued to Tonchen. The Tonchen patent discloses a relatively flexible band clamp which is preformed in a central region of the band intermediate the reinforcement bars. The preformed central section approximates a portion of a circle such that it conforms to some degree to the circular configuration of the exhaust pipes to be joined. Since the central section is preformed it is not necessary that it stretch to conform about the pipes. Therefore, the non-uniform stretching problem associated with frictional loads on flat band clamps is, at least conceptually, mitigated.

However, it is perceived that when a central preform clamp like that disclosed in the Tonchen patent is wrapped about a joint a "bulge" frequently develops in the central preformed region. In order to eliminate the bulge, long clamping bolts and relatively large clamping pressures are required.

Figures 1A, 1B:
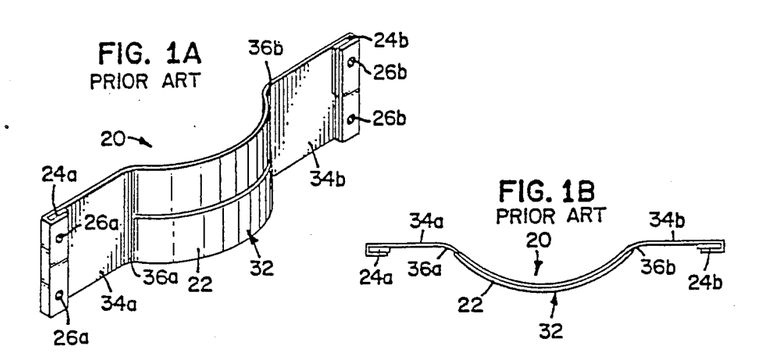
FIG. 1A shows a perspective view of a prior art centrally preformed clamp prior to use.
FIG. 1B shows a top plan view of the clamp of FIG. 1A prior to use.
Figures 1C, 2, 3A, 3B:
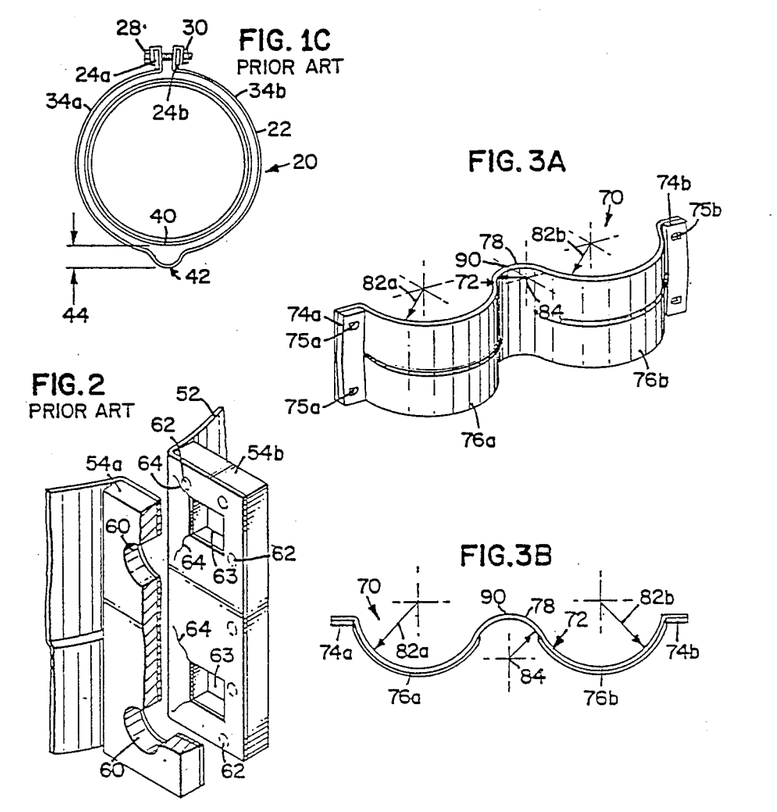
FIG. 1C shows a top plan view of the clamp of FIG. 1A wrapped about a pipe joint prior to fully drawing the reinforcing bars together.
FIG. 2 shows a partial perspective view of a second prior art clamp wrapped about a tube joint.
FIG. 3A shows a perspective view of one embodiment of the clamp of the present invention prior to use.
FIG. 3B shows a top plan view of the clamp of FIG. 3A.

FIGS. 1A, 1B and 1C show a prior art clamp 20 of the type disclosed in the Tonchen patent. The clamp 20 includes a band 22 provided with reinforcing bars 24a, 24b at the opposite ends thereof. The band 22 is typically of Type 304 annealed soft (non-hardened) stainless steel having a thickness of 0.020 inch and a width of 3 inches. The reinforcing bars 24 are typically made of mild steel. The reinforcing bars 24 have bolt holes 26 suitable for receiving standard hex head bolts 28 and hex nuts 30.

The band 22 of prior art clamp 20 includes a central curved portion 32 disposed between a pair of flat portions 34a, 34b which terminate at the reinforcing bars 25 and are typically welded thereto. As shown in FIG. 1B, reversely curving connecting portions 36a, 36b are transitional between the central curved portion 32 and the flat portions 34. The radius of the central curved portion 32 is typically approximately equal to that of the tubes to be joined by the clamp 20.

FIG. 1C shows a plan view of the prior art clamp 20 in use. The clamp 20 is wrapped about a pair of tubes 40 which are to be joined. The bolts 28 and nuts 30 have been engaged and finger-tightened, leaving a gap between the reinforcing bars 24.

As noted above, when the bolts 28 and nuts 30 are initially assembled, as shown in FIG. 1C, a bulge 42 often develops in the central curved portion 32 of band 22. This bulge 42 can have a bulge height 44 of as much as ½ inch.

Considerable effort must be expended to further draw the reinforcing bars 24 together to eliminate the bulge 42 to prevent paraxial sound and exhaust leaks. Friction between the tubes 40 and the band 22 makes it difficult to eliminate this bulge 42 in some cases. It has been determined that this is particularly troublesome when the band 22 of clamp 20 is fabricated using a less ductile metal, e.g., Type 409 stainless steel.

The prior art also includes a second prior art clamp 50, a portion of which is illustrated in FIG. 2. Donaldson Co., Inc., the assignee herein, sells a clamp such as this, referring to it as a "Preformed Clamp". Like clamp 20, clamp 50 includes a thin steel band 52 and a pair of reinforcing bars 54. The bars 54 are apertured to receive a pair of standard carriage bolts (not shown) which are threadedly engaged by hex nuts (not shown). More specifically, reinforcing bar 54b forms a pair of square holes 63 (for the square portions of the carriage bolts) whereas reinforcing bar 54a forms a pair of round holes 60. Carriage bolts are used to simplify the assembly process, necessitating only a single wrench.

The square holes also create significant stress in the area near the holes, however. Stress risers accompany the sharp edges of the square holes, with the result being that the thin steel band 52 can tear near the holes. This problem is depicted in FIG. 2. As can be seen, the band 52 is spot welded to the reinforcing bars 54 at spot welds 62. The spot welds 62 to some degree absorb the tensile stresses introduced in the band 52 during the clamp tightening process, and this stress distribution can be improved still further (at added cost) by wrapping the steel band 52 about the reinforcing bars 54 so that in fact two holes are formed in the stainless steel band 52 for each hole formed by the reinforcing bar 54. See McGowen et al, for example. It has been determined, however, that these techniques do not adequately eliminate high stress areas adjacent the square holes 63. Stress risers occur at the corners of the square holes 63, and tearing 64 of the steel band 52 occurs at the corners of the square holes 63. This problem is thought to be even more severe in connection with less ductile bands 52. Ductile metal bands made of, e.g., 304 stainless steel, can stretch to accommodate or relieve high stresses. However, less ductile metals such as Type 409 stainless steel are less forgiving in terms of tearing.

The present invention addresses the shortcomings of the prior art couplers. In particular, preferred embodiments of the invention address the cost constants associated with 304 stainless steel clamps; the field storage problem; the "bulge" problem associated with the type of clamp disclosed in U.S. Pat. No. 4,466,642; and the stress concentration problems discussed above.

SUMMARY OF THE INVENTION

The invention includes a clamp suitable for joining a pair of tubular members, including:

(a) a band having a length substantially equal to the circumference of the tubular members;

(b) a pair of half-carriage bolts and a pair of hex nuts;

(c) a first reinforcing member attached to one end of the band forming a pair of D-shaped holes suitable for receiving and engaging the D-shaped portions of the half-carriage bolts; and (d) a second reinforcing member attached to the other end of the band forming a pair of holes suitable for receiving the threaded portions of the half-carriage bolts, wherein when the clamp is placed about the joint between the tubular members and when the half-carriage bolts are inserted into the holes formed by the reinforcing members, the hex nuts can be threadedly engaged with the half-carriage bolts to draw the reinforcing members together and the band into sealing engagement with the tubular members, whereby the D-shaped holes prevent the half-carriage bolts from turning and decrease stress risers in the band adjacent the D-shaped holes.

The reinforcing members are preferably reinforcing bars which sealingly join the tubular members in spite of circumferential differences therebetween. For example, the reinforcing bars can be bent, notched, offset, or the like.

While the band can be completely flat prior to use, it can also be S-shaped (having a pair of forward curved portions on either side of a central portion), or preformed into a substantially cylindrical configuration.

While clamps according to the invention can be made literally from any material, the band is preferably made from a metal which is less ductile, and therefore probably less expensive, than Type 304 stainless steel. A preferred metal for the band is Type 409 stainless steel. The invention is not limited to a clamp having D-shaped holes. In fact, the invention includes a clamp suitable for joining a pair of tubular members, including:

(a) a band having a length substantially equal to the circumference of the tubular members, wherein the band comprises a pair of forward curved portions on either side of a central portion;

(b) a pair of bolts and a pair of nuts;

(c) a first reinforcing member attached to one end of the band forming a pair of holes suitable for operatively receiving the bolts; and (d) a second reinforcing member attached to the other end of the band forming a pair of holes suitable for operatively receiving the bolts, wherein the clamp is placed about the joint between the tubular members by placing the central band portion in contact with the joint and using the bolts and nuts to draw the forward curved portions toward and into sealing engagement with the tubular members.

Preferably, though not necessarily, the reinforcing members of the "S-shaped" band referred to above form D-shaped apertures to accommodate half-carriage bolts.

BRIEF DESCRIPTION OF THE DRAWING

The invention will be further explained by reference to the Drawing having the following Figures.

DETAILED DESCRIPTION OF PREFERRED EMBODIMENTS

With reference to the Drawing, wherein like reference numerals designate like parts and assemblies throughout the several views, FIGS. 3 and 4 show one clamp 70 according to the present invention. The clamp 70 includes a band 72 provided with reinforcing bars 74 at opposite ends thereof. The band 72 can be fabricated from ductile materials such as Type 304 stainless steel, but is preferably fabricated from less expensive, less ductile metals such as Type 409 stainless steel. The reinforcing bars 74 are preferably made of mild steel and form D-shaped holes 75 suitable for receiving "half-carriage" bolts 100 shown in FIG. 7.

The clamp 70 preferably includes a pair of forward curved portions 76 on either side of a central reverse curved portion 78. Each forward curved portion 76 is attached at one end to the central curved portion 78 and at its other end to one of the reinforcing bars 74. The forward curved portions 76 are each more than one-third the total length of clamp band 72 and have a radius of curvature 82 greater than the radii of the tubes on which the clamp is to be installed. The central reverse curved portion 78 is less than one-third the length of the band 72 and preferably has a radius of curvature 84 less than the radii of the tubes on which the clamp is to be installed. Radius of curvature 84 should not be so small that a crease forms in the band 72, however. A typical exhaust system has a nominal four inch diameter. Accordingly, the forward curved portions of a clamp 70 for such a system should be provided with curved portions 76 having lengths of approximately 4¼ inches and radii of curvature roughly equal to or slightly greater than 2 inches; the central portion should preferably be approximately 4 inches long and have a radius of approximately 1¼ inches, or less. Of course, these dimensions are merely illustrative and the invention is not limited to any particular pipes or dimensions.

It should be emphasized that the curved portions 76 and 78 of the band 72 need not be portions of cylinders per se. Preferably, however, they are arcuate in nature. It should also be emphasized that the central portion 78 need not necessarily be curved at all. That is, there can be a flat central area between the curved portions 76. At the apex of the central portion 78 is a center point 90, the significance of which is further discussed below.

Figure 3C:
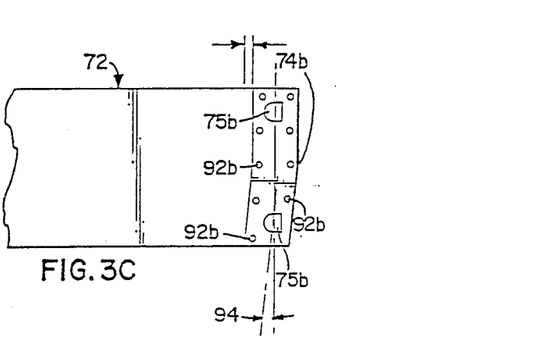
FIG. 3C shows a side elevational view of the clamp of FIG. 3A prior to use.

FIG. 3C shows an elevational view of the clamp 70 prior to use. As shown, the reinforcing bars 74 are preferably bent so as to have two rectangular portions substantially the same length, making an angle 94 therebetween. The angle 94 can be any angle, depending on the tubes to be joined, but it has been found that an angle of approximately 5 degrees is suitable for most purposes. As well known to the ordinarily skilled designer of such clamps, the bars 74 are bent so that the reinforcing bars will allow the band 72 to simultaneously engage and seal against the larger and the smaller diameter tubes. Each bar 74 is therefore bent such that there is an offset 93 between the rectangular portions thereof approximately equal to the thickness of the walls of the outer tube.

FIG. 3C also illustrates spot welds 92 attaching the band 72 to the reinforcing bars 74. As noted above, spot welding alone can lead to objectionable stress at the bolt holes. The D-shaped holes 75 formed by the reinforcing bars 74 substantially eliminate the stress risers near the holes 75 as further described below.

Figure 4A:
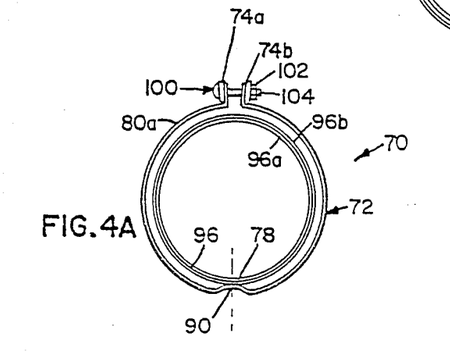
FIG. 4A shows a plan view of the clamp of FIG. 3A wrapped about a pipe joint prior to fully drawing the reinforcing bars together.

FIG. 4A depicts the clamp 70 of the present invention wrapped about a pair of tubes 96 to be joined together. The clamp 70 is shown with the reinforcing bars 74 partially drawn together, in the same manner FIG. 1C illustrates prior art clamp 20. As can be seen, the forward curved portions 76 pivot about center point 90 into contact with the tubes 96. This eliminates much of the friction between the band 72 and the tubes 96, and therefore less torque need be applied to the hex nuts 102 during the assembly process. Also, a bulge is not created at the center point 90 and need not be eliminated, as was the case for the clamp shown in FIG. 1. With the substantial elimination of friction, tensile stress is more uniformly distributed over the entire length of the band and the ends of the band need not stretch to a large degree in comparison to the middle. Thus, less ductile materials, such as Type 409 stainless steel, can be used.

Figure 4B:
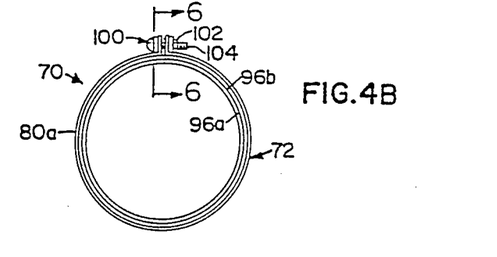
FIG. 4B shows a plan view of the clamp of FIG. 3A wrapped about a pipe joint and tightened.

FIG. 4B shows the clamp 70 tightened about tubes 96. The relatively thin band 72 has fully conformed to tubes 96, leaving no bulges or indentations.

Figure 5:
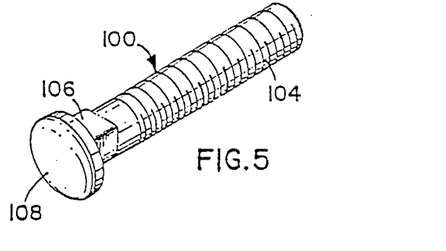
FIG. 5 shows an enlarged perspective view of a half-carriage bolt according to the invention.

FIG. 5 shows an enlarged perspective view of the "half-carriage" bolt 100 used in conjunction with the clamp 70 of the present invention. The half-carriage bolt 100 includes a conventional threaded portion 104 and a D-shaped portion 106 suitable for sliding insertion through the D-holes 75. A standard carriage bolt head 108 is attached to the D-shaped portion 106. The half-carriage bolt 100 is preferably fabricated from conventional materials using conventional techniques. For example, a conventional carriage bolt can be cold headed using a suitable die. It should be noted that the head 108 of the half-carriage bolt 100 can be positioned adjacent either reinforcement bar 74a or 74b: since both reinforcement bars 74 form D-shaped holes 75, the D-shaped portion 106 can reside within either D-hole 75a or 75b.

Figure 6:
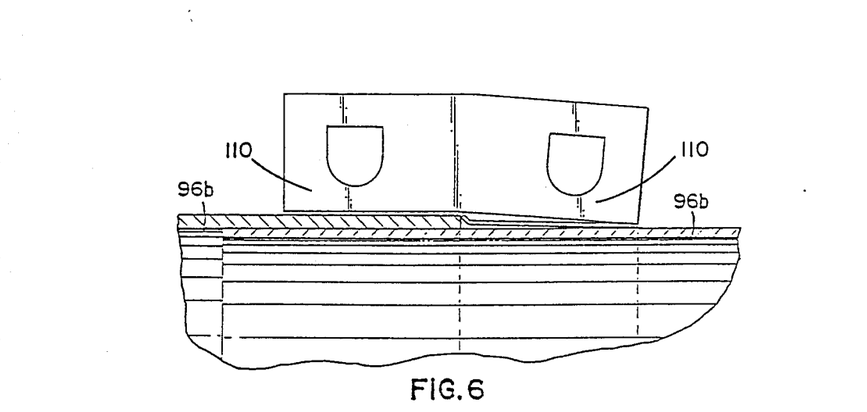
FIG. 6 shows an enlarged sectional view of the clamp of FIG. 3 taken substantially along line 6—6 of FIG. 5B.

FIG. 6 shows an enlarged sectional view of an assembled clamp 70, taken generally along line 6—6 of FIG. 4B. The D-holes 75 substantially eliminate stress risers in the regions 110 so as to substantially prevent tearing during the assembly process. Thus, less ductile, less expensive materials such as Type 409 SS can be used for the band 72.

Figure 7:
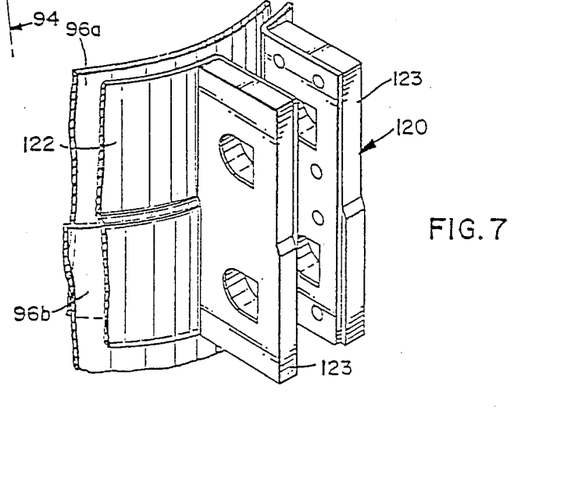
FIG. 7 shows a partial perspective view of a second clamp embodiment according to the invention.

FIG. 7 illustrates a second clamp embodiment 120 of the present invention. The clamp 120 is shown wrapped about a pair of tubes 96a, 96b prior to joining of the tubes. The clamp 120 includes a band 122 preferably fabricated of a relatively inexpensive, less ductile material such as Type 409 stainless steel, and mild steel reinforcing bars 123.

The band 122 is preformed into a substantially cylindrical shape, rather than the "S" shape of the clamp 70 shown in FIG. 3. A fully preformed clamp is preferable for factory installation, since this style eliminates the hand wrapping operation used to install flat or semi-flat clamps such as the ones discussed above. Reinforcing bars 123 are offset so as to conform both to the larger and smaller diameter tubes 96b and 96a, respectively. Offset bars having a zigzag shape, are shown in U.S. Reissue Pat. No. 30,402, FIG. 12 and accompanying text, incorporated herein by reference. The offset bars discussed in the Reissue No. 30,042 resiliently conform to the smaller and larger tubes, however, whereas a permanent "zigzag" shape is machined into bars 123.

Figure 8:
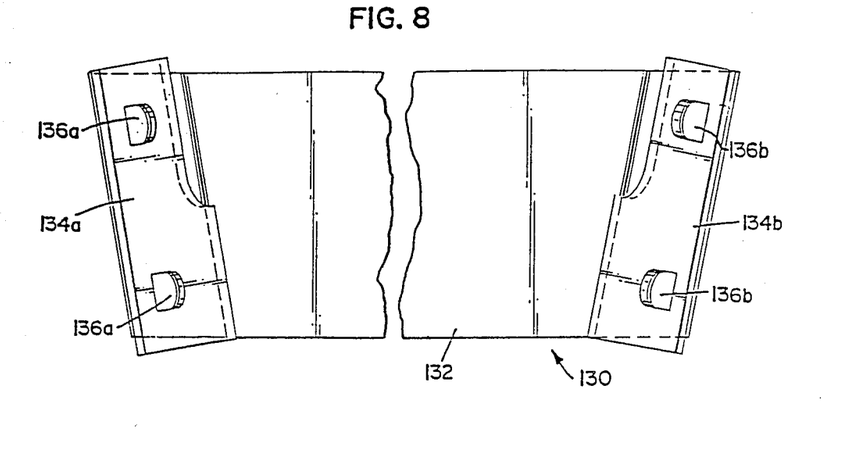
FIG. 8 shows a side elevational view of a third clamp embodiment according to the invention.
Figure 9:
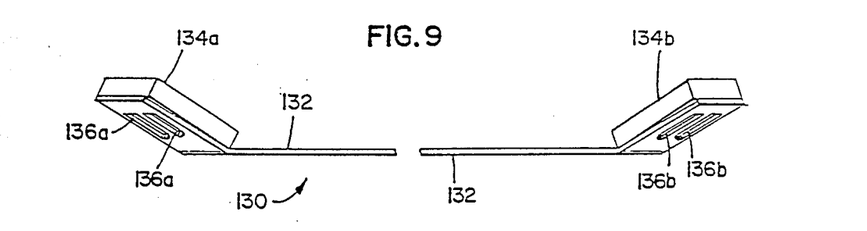
FIG. 9 shows an end view of the clamp embodiment of FIG. 8.

Finally, FIGS. 8 and 9 show a third clamp embodiment 130 according to the invention. Clamp 130 includes a flat (as opposed to S-shaped or cylindrical) band 132 spanning between a pair of mild steel reinforcing bars 134 similar to the bars 74 described above with reference to FIGS. 3, 4 and 6. Bars 134 are "notched" and angled, however, so as to make more band material available for the larger diameter tube and correspondingly less band material available for the smaller diameter tube. Notched bars are generally shown and described in U.S. Pat. No. 4,142,743 whereas the concept of angled bars is shown in Reissue No. 30,042, FIGS. 16–18 and accompanying text, incorporated herein by reference. Bars 134 form D-shaped holes 136. Compared to the S-shaped band 72, the flat band 132 requires more forming in the field and is more likely to suffer from excessive friction between the band 132 and the tubes. On the other hand, its compactness is advantageous for storage purposes and the D-shaped holes 136 eliminate tearing during installation in spite of the tube/band friction.

Of particular note is the use of bent, notched, offset, and/or angled bars to accommodate a smaller diameter tube inserted within a larger diameter tube. These techniques can be termed "circumference compensation" techniques. The common goal of all of these techniques is to provide roughly $\pi$ (D-d) additional band material for the larger tube, where D is the outside diameter of the larger tube and d is the outside diameter of the smaller tube. Stated another way, the techniques supply roughly $2\pi$ t more band material to the larger diameter tube, where t is the thickness of the larger diameter tube. The techniques can be combined, also. For example, FIGS. 8 and 9 show angled, notched bars 134. The circumference compensation techniques are particularly important when less ductile band material such as 409 stainless steel is used, since such bands will not as readily stretch to accommodate varying circumferences.

Preferred embodiments of the invention have been disclosed. Other modifications of the invention which are not specifically disclosed or referred to will be apparent to those skilled in the art in light of the foregoing description. Put simply, this description is intended to provide concrete examples of preferred embodiment structures and applications, clearly disclosing the present invention and its operative principles. Accordingly, the invention is not limited to any particular embodiments or configurations and variations of the present invention which fall within the spirit and broad scope of the appended claims are covered.

We claim:

1. A clamp suitable for joining a pair of tubular members, comprising:
   (a) a ductile band having a length substantially equal to the circumference of the tubular members;
   (b) a pair of half-carriage bolts having a D-shaped portion disposed adjacent a head portion and a pair of hex nuts;
   (c) a first reinforcing member attached to one end of the band forming a pair of D-shaped holes suitable for receiving and engaging the D-shaped portions of the half-carriage bolts, said D-shaped holes disposed with the rounded corners thereof facing said band; and
   (d) a second reinforcing member attached to the other end of the band forming a pair of holes suitable for receiving the threaded portions of the half-carriage bolts, wherein when the clamp is placed about the joint between the tubular members and when the half-carriage bolts are inserted into the holes formed by the reinforcing members, the hex nuts can be threadedly engaged with the half-carriage bolts to draw the reinforcing members together and the band into sealing engagement with the tubular members, whereby the D-shaped holes prevent the half-carriage bolts from turning and decrease stress risers in the band adjacent the D-shaped holes.

2. The clamp of claim 1, wherein the reinforcing members are reinforcing bars which sealingly join the tubular members in spite of any circumferential differences therebetween.

3. The clamp of claim 2, wherein the reinforcing bars are bent.

4. The clamp of claim 1, wherein the band is substantially flat prior to use.

5. The clamp of claim 1, wherein the band comprises a pair of forward curved portions on either side of a central portion.

6. The clamp of claim 5, wherein the central portion has a reverse curve relative to the forward curved portions.

7. The clamp of claim 6, wherein the radius of curvature of the forward curved portions is substantially equal to the radii of the tubular members.

8. The clamp of claim 1, wherein the band is made of metal.

9. The clamp of claim 8, wherein the metal is less ductile than Type 304 stainless steel.

10. The clamp of claim 9, wherein the metal is Type 409 stainless steel.

11. The clamp of claim 1, wherein the band is preformed into a substantially cylindrical shape.

12. The clamp of claim 2, wherein the reinforcing bars are notched.

13. The clamp of claim 2, wherein the reinforcing bars are offset.

14. The clamp of claim 2, wherein the reinforcing bars are angled.

15. A clamp suitable for joining a pair of tubular members, comprising:
   (a) a ductile band having a length substantially equal to the circumference of the tubular members, wherein the band comprises a pair of clamping members curved to conform generally to the outer surface of the tubular member and connected by central member curved to form an apex portion adapted to engage the tubular members and provide a point about which said clamping members pivot during assembly;
   (b) a pair of bolts and a pair of nuts;
   (c) a first reinforcing member attched to one end of the band forming a pair of holes suitable for operatively receiving the bolts; and
   (d) a second reinforcing member attached to the other end of the band forming a pair of holes suitable for operatively receiving the bolts, wherein the clamp is placed about the joint between the tubular members by placing the central member in contact with the joint and using the bolts and nuts to draw the clamping members toward and into sealing engagement with the tubular members.

16. The clamp of claim 15, wherein the radii of the forward curved portions are substantially equal to the radii of the tubular members.

17. The clamp of claim 15, wherein the holes in the reinforcing members are D-shaped with the rounded corners thereof facing said band and the bolts are half-carriage bolts having a D-shaped portion disposed adjacent a head portion.

18. The clamp of claim 15, wherein the reinforcing members are reinforcing bars which sealingly join the tubular members in spite of any circumferential differences therebetween.

19. The clamp of claim 18, wherein the reinforcing bars are bent.

20. A clamp suitable for joining a pair of exhaust pipes having different circumferences, comprising:
   (a) a flat Type 409 stainless steel band having a length substantially equal to the circumference of the pipes;
   (b) a pair of half-carriage bolts having a D-shaped portion disposed adjacent a head portion and a pair of hex nuts;
   (c) a first mild steel reinforcing bar attached to one end of the band forming a pair of D-shaped holes suitable for receiving and engaging the D-shaped portions of the half-carriage bolts, said D-shaped holes disposed with the rounded corners thereof facing said band; and
   (d) a second mild steel reinforcing bar attached to the other end of the band forming a pair of D-shaped holes suitable for receiving the threaded portions of the half-carriage bolts, said D-shaped holes disposed with the rounded corners thereof facing said band, wherein each reinforcing bar creates an offset between opposite ends of the bar substantially equal to the thickness of the exhaust pipe having the larger circumference, wherein when the flat clamp is placed about the joint between the pipes and when the half-carriage bolts are inserted into the holes formed by the reinforcing bars, the hex nuts can be threadedly engaged with the half-carriage bolts to draw the reinforcing bars together and the band into sealing engagement with the pipes, whereby the D-shaped holes prevent the half-carriage bolts from turning and decrease stress risers in the band adjacent the D-shaped holes.

21. The clamp of claim 20, wherein the reinforcing bars are notched.

22. The clamp of claim 20, wherein the reinforcing bars are angled.

23. A clamp suitable for joining a pair of exhaust pipes having different circumferences, comprising:
   (a) an S-shaped Type 409 stainless steel band having a length substantially equal to the circumference of the tubular members comprising a pair of forward curved portions on either side of a reverse curved central portion, wherein each forward curved portion has a radius substantially equal to the radii of the pipes being joined and a length slightly greater than one-third the length of the band, and wherein the central portion has a radius of curvature less than the radii of the forward curved portions and has a length less than one-third the entire length of the band;
   (b) a pair of half-carriage bolts having a D-shaped portion disposed adjacent a head portion and a pair of hex nuts;
   (c) a first mild steel reinforcing bar attached to one end of the band forming a pair of D-shaped holes suitable for receiving and engaging the D-shaped portions of the half-carriage bolts, said D-shaped holes disposed with the rounded corners thereof facing said band; and
   (d) a second mild steel reinforcing bar attached to the other end of the band forming a pair of D-shaped holes suitable for receiving the threaded portions of the half-carriage bolts, said D-shaped holes disposed with the rounded corners thereof facing said band, wherein the clamp is placed about the joint between the pipes by placing the central band portion in contact with the joint and using the half-carriage bolts and nuts to draw the forward curved portions toward and into sealing engagement with the pipes, and wherein the D-shaped holes prevent the half-carriage bolts from turning and decrease stress risers in the bad adjacent the D-shaped holes.

24. The clamp of claim 23, wherein the reinforcing bars are bent.

25. A clamp suitable for joining a pair of exhaust pipes having different circumferences, comprising:
   (a) a substantially cylindrical Type 409 stainless steel band having a circumference substantially equal to the circumference of the tubular members;
   (b) a pair of half-carriage bolts having a D-shaped portion disposed adjacent a head portion and a pair of hex nuts;

(c) a first mild steel reinforcing bar attached to one end of the band forming a pair of D-shaped holes suitable for receiving and engaging the D-shaped portions of the half-carriage bolts, said D-shaped holes disposed with the rounded corners thereof facing said band, and (d) a second mild steel reinforcing bar attached to the other end of the band forming a pair of D-shaped holes suitable for receiving the threaded portions of the half-carriage bolts, said D-shaped holes disposed with the rounded corners thereof facing said band, when the fully preformed clamp is placed about the joint between the pipes and when the half-carriage bolts are inserted into the D-shaped holes formed by the reinforcing pipes, the hex nuts can be threadedly engaged with the half-carriage bolts to draw the reinforcing bars together and the band into sealing engagement with the pipes, whereby the D-shaped holes prevent the half-carriage bolts from turning and decrease stress risers in the band adjacent the D-shaped holes.

26. The clamp of claim 25, wherein the reinforcing bars sealingly joint the tubular members in spite of any circumferential differences therebetween.

27. The clamp of claim 26, wherein the reinforcing bars are offset.

28. A clamp suitable for using a plurality of half-carriage bolts having a D-shaped portion disposed adjacent a head portion and nuts to join a pair of tubular members, comprising:
    (a) a ductile band having a length substantially equal to the circumference of the tubular members;
    (b) a first reinforcing member attached to one end of the band forming a plurality of D-shaped holes suitable for receiving and engaging the D-shaped portions of the half-carriage bolts, said D-shaped holes disposed with the rounded corners thereof facing said band; and
    (c) a second reinforcing member attached to the other end of the band forming a plurality of holes suitable for receiving the threaded portions of the half-carriage bolts, wherein when the clamp is placed about the joint between the tubular members and when the half-carriage bolts are inserted into the holes formed by the reinforcing members, the hex nuts can be threadedly engaged with the half-carriage bolts to draw the reinforcing members together and the band into sealing engagement with the tubular members, whereby the D-shaped holes prevent the half-carriage bolts from turning and decrease stress risers in the band adjacent the D-shaped holes.

29. A clamp suitable for receiving threaded connectors to join a smaller diameter commercial truck exhaust pipes with a larger diameter commercial truck exhaust pipe, wherein the larger diameter pipe has a wall thickness of t, comprising:
    (a) a band having a length substantially equal to the circumference of the tubular members, wherein the band is made of a metal which is less ductile than Type 304 stainless steel;
    (b) a pair of half-carriage bolts having a D-shaped portion disposed adjacent a head portion;
    (c) a first mild steel reinforcing bar attached to one end of the band; and
    (d) a second mild steel reinforcing bar attached to the other end of the band, wherein each bar forms a pair of D-shaped holes suitable for receiving said half-carriage bolts, said D-shaped holes disposed with the rounded corners thereof facing said band, and wherein each bar is configured and attached to provide $2\pi t$ more band material to the larger exhaust pipe than to the smaller exhaust pipe, whereby when the band is wrapped about the joint and the threaded connectors draw the reinforcing bars together, the pipes are sealingly joined despite their circumferential differences.

* * * * *

UNITED STATES PATENT AND TRADEMARK OFFICE
CERTIFICATE OF CORRECTION

PATENT NO. : 4,790,574

DATED : December 13, 1988

INVENTOR(S) : Wayne M. Wagner et al

It is certified that error appears in the above-identified patent and that said Letters Patent is hereby corrected as shown below:

Col. 3, Line 19
"25" should be --24--

Col. 4, Line 15
"constaints" should be --constraints--

Col. 5, Line 40
"5B" should be --4B--

Col. 6, Line 15
"1 1/4" should be --1 1/2--

Col. 7, Line 38
"30,402" should be --30,042--

Signed and Sealed this

Eighth Day of May, 1990

*Attest:*

HARRY F. MANBECK, JR.

*Attesting Officer*  *Commissioner of Patents and Trademarks*